June 7, 1938.   H. PAXTON   2,119,869
PLANETARY BRUSHER
Filed June 28, 1935   4 Sheets-Sheet 1

INVENTOR
HALE PAXTON
BY
ATTORNEY

June 7, 1938. H. PAXTON 2,119,869
PLANETARY BRUSHER
Filed June 28, 1935 4 Sheets-Sheet 2
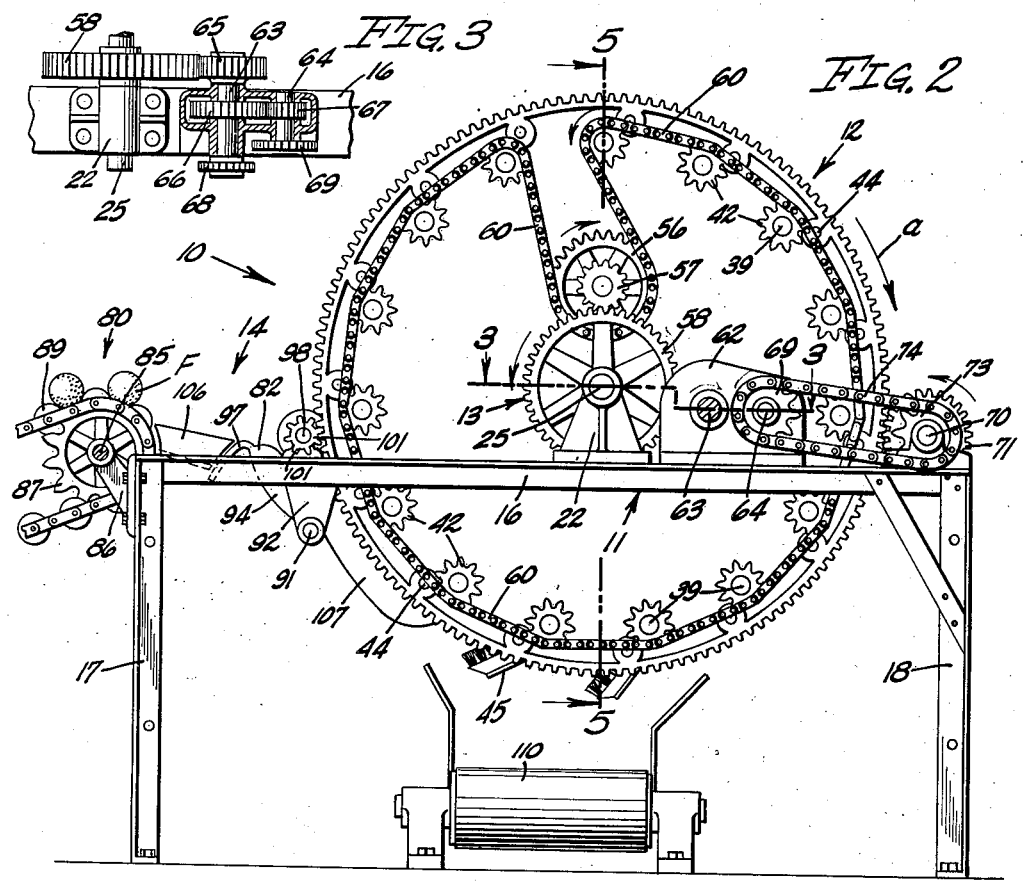
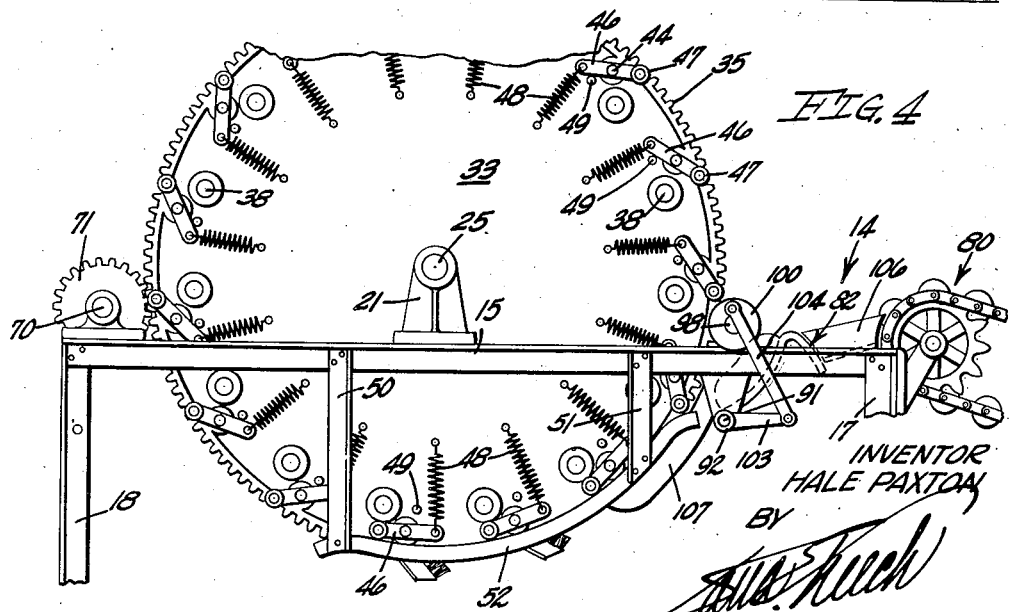
INVENTOR
HALE PAXTON
BY
ATTORNEY June 7, 1938.    H. PAXTON    2,119,869
PLANETARY BRUSHER
Filed June 28, 1935    4 Sheets-Sheet 3
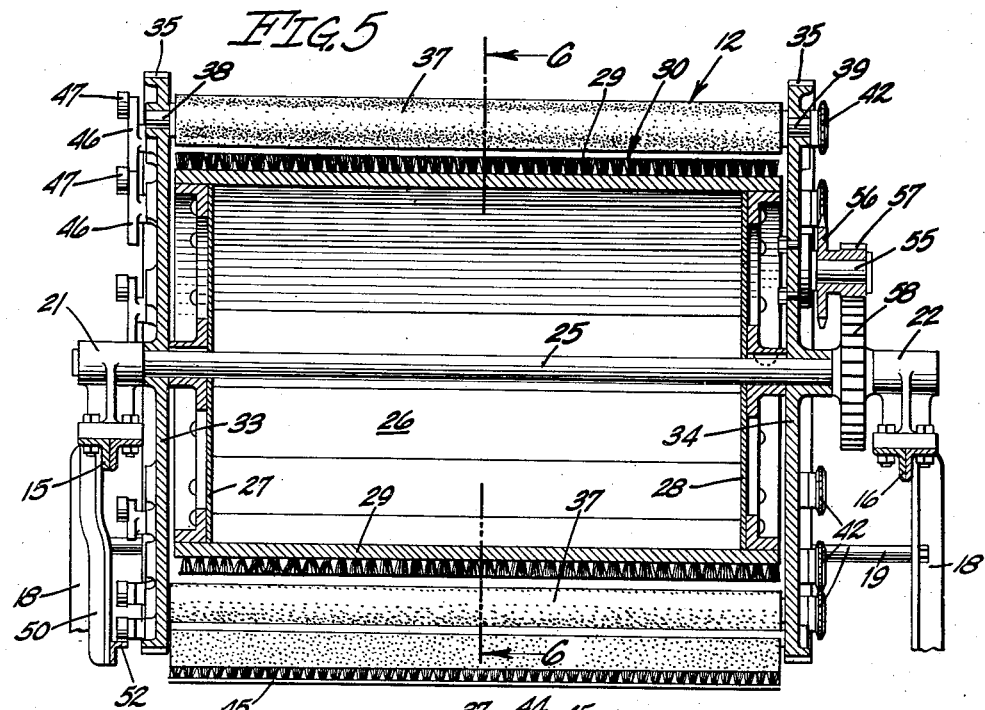
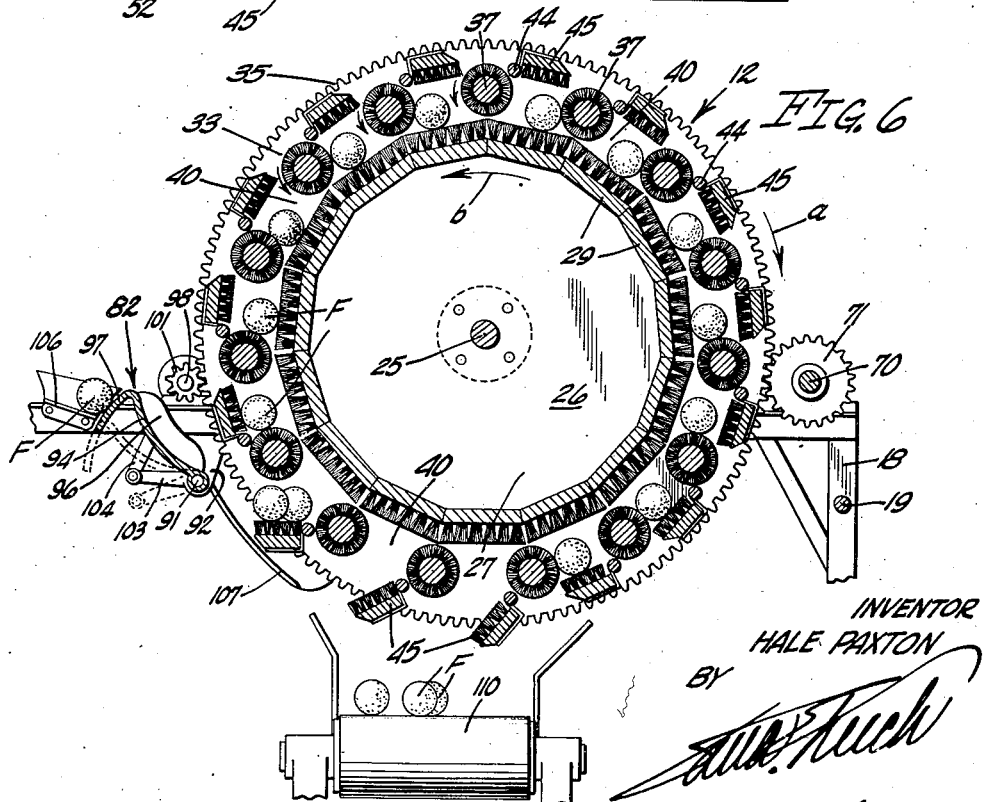
INVENTOR
HALE PAXTON
BY
ATTORNEY June 7, 1938. H. PAXTON 2,119,869
PLANETARY BRUSHER
Filed June 28, 1935 4 Sheets-Sheet 4
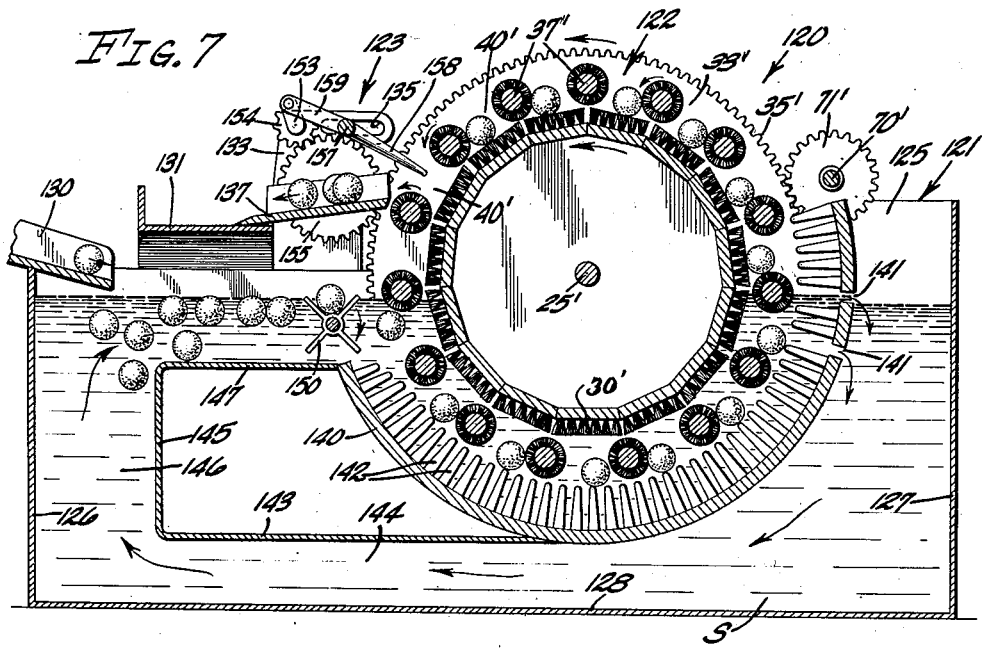
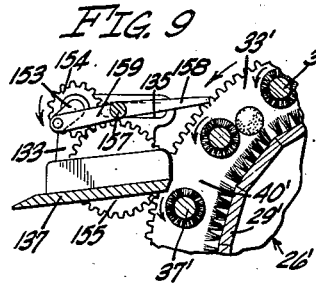
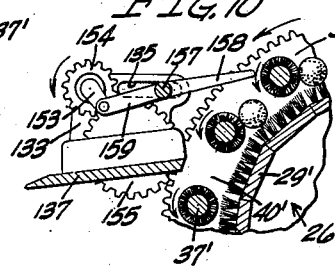
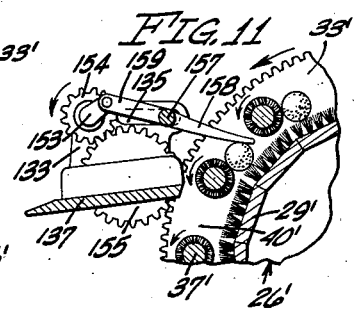
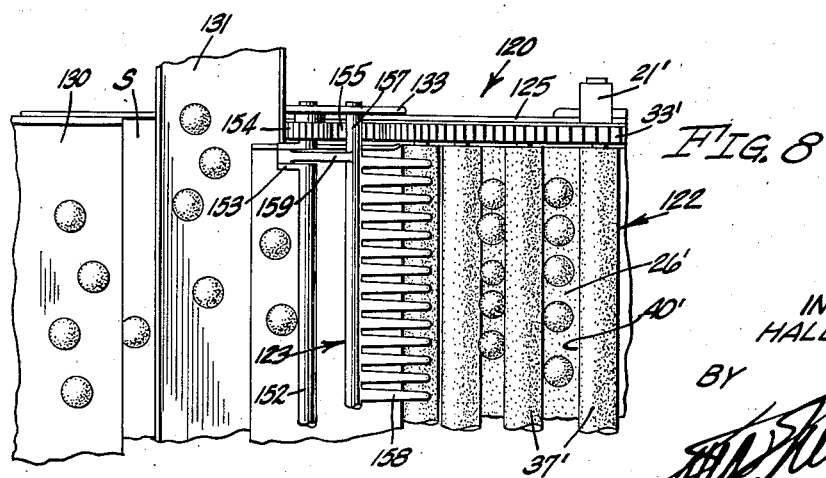
INVENTOR
HALE PAXTON
BY
ATTORNEY Patented June 7, 1938

2,119,869

UNITED STATES PATENT OFFICE 2,119,869

PLANETARY BRUSHER

Hale Paxton, Santa Ana, Calif., assignor, by mesne assignments, to Food Machinery Corporation, a corporation of Delaware Application June 28, 1935, Serial No. 28,812

14 Claims. (Cl. 146—202)

My invention relates to the preparation of agricultural produce for market and has particular reference to a machine for washing, drying, polishing, or otherwise treating citrus fruits and the like.

Prior to being packed for shipment, citrus fruits are usually soaked in tanks containing cleaning solution to loosen any dirt, scale or other surface impurities adhering to the surface thereof. The fruit is then conveyed to a brushing machine and thoroughly brushed to remove the loosened impurities.

The brushers generally used in the citrus packing houses comprise a relatively long, narrow frame in which a plurality of transverse, closely spaced, rotary brushes are journalled, this type of machine being commonly referred to as a "transverse brusher". The fruit enters one end of these brushers and is fed along over the rotating brushes to the other end of the machine.

In order to thoroughly brush the fruit and handle the required quantity thereof, these machines must be of sufficient length to provide the required amount of brushing surface, thus occupying a considerable amount of floor space.

Accordingly, an object of my invention is to provide a fruit brusher having the required capacity and brushing surface, yet occupying a minimum amount of floor space.

In the aforedescribed transverse brush washer, the fruit tends to remain in the valleys between each pair of the cylindrical brushes until being displaced therefrom and crowded into the next valley by oncoming fruit. After a given lot of fruit is brushed in a transverse brush washer, the machine remains full of residual fruit which must be cleaned out before another lot of fruit can be brushed. The cleaning out operation must be done manually or by a suitable mechanism provided therefor.

It is, accordingly, another object of my invention to provide a fruit brushing machine that will clean itself out without the necessity of providing additional mechanism for accomplishing this operation.

A further object of my invention is to provide a fruit brushing machine that can be effectively combined with a fruit soaking tank to produce an extremely compact soaking and brushing unit and to eliminate the necessity of providing conveying mechanism for carrying fruit from a soaking tank to a brusher as is the present practice.

In the aforementioned soaking tanks, used in conjunction with the transverse brush washer, suitable mechanism is usually employed for submerging the fruit in the cleaning solution in order to present the entire surface of each piece of fruit to the solution.

Accordingly, another object of my invention is to provide a combined soaking tank and brusher in which the brushing unit serves as a means for submerging the fruit in the cleaning solution.

Still another object of my invention is the provision of a fruit washing machine in which the fruit is scrubbed by the brushing elements of the washer while being submerged in cleaning solution.

Other objects and advantages will be made manifest in the following description taken in connection with the accompanying drawings, in which:

Fig. 2 is a side elevational view looking in the direction of the arrow 2 of Fig. 1, a portion of the machine being broken away.

Fig. 3 is a fragmentary, horizontal, sectional view taken on the line 3—3 of Fig. 2.

Fig. 4 is a side elevational view looking in the direction of the arrow 4 of Fig. 1.

Fig. 5 is a vertical sectional view taken on the line 5—5 of Fig. 2.

Fig. 6 is a vertical sectional view taken on the line 6—6 of Fig. 5.

Fig. 7 is a vertical sectional view of a modified form of my invention.

Fig. 8 is a fragmentary plan view of a portion of the machine shown in Fig. 7.

Figs. 9, 10 and 11 are fragmentary views showing the operation of a portion of the machine shown in Fig. 7.

Figure 1:
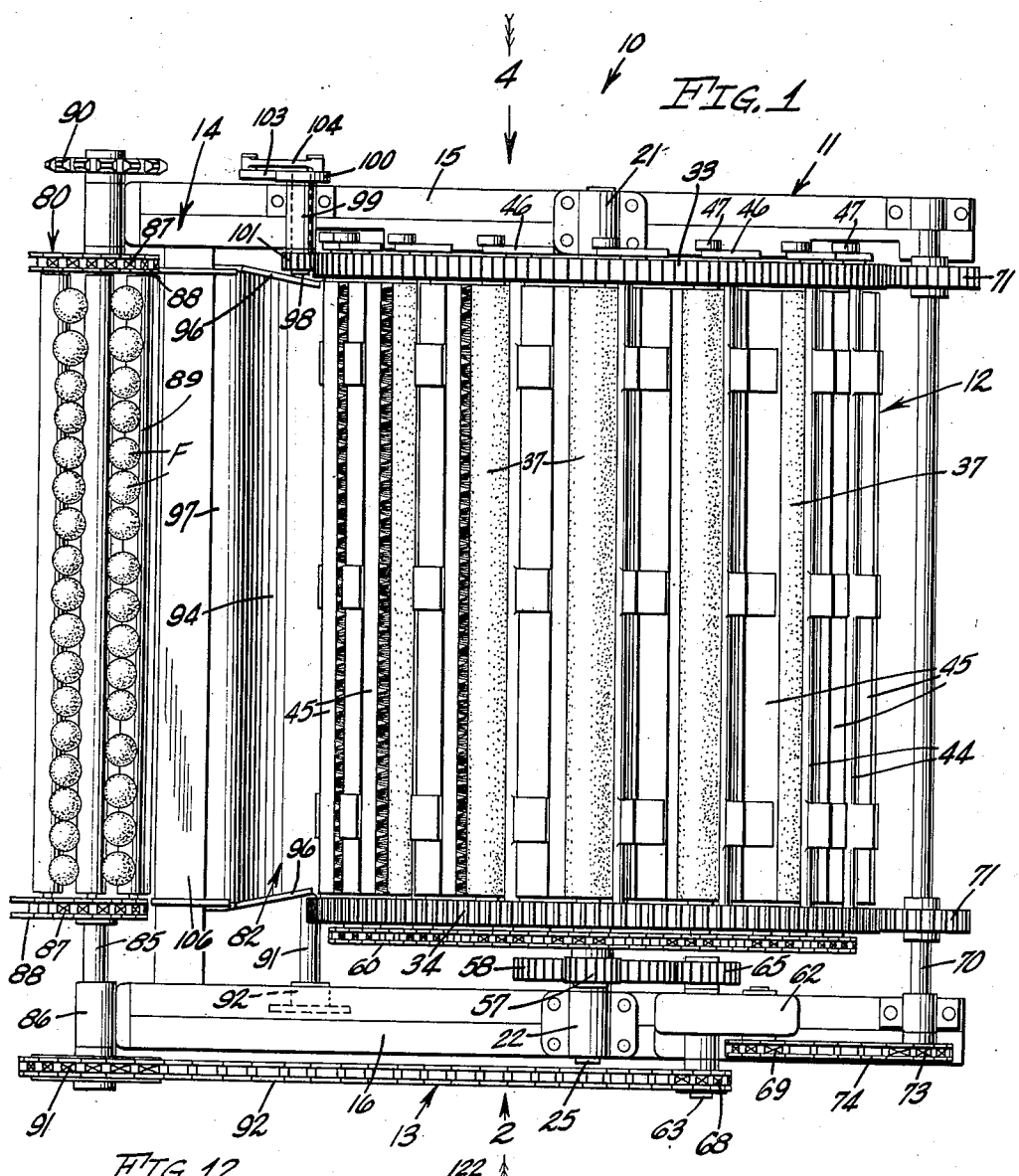
Fig. 1 is a plan view of a preferred embodiment of my invention.

Referring specifically to Figs. 1 to 6 of the drawings, I have shown therein a fruit brusher 10 comprising a preferred embodiment of my invention, this brusher including a frame 11, a cylindrical fruit brushing unit 12, a brushing unit drive mechanism 13, and a fruit feeding mechanism 14.

The frame 11 includes a pair of horizontal bars 15 and 16 as seen in Figs. 1 and 5. The bars 15 and 16 are supported from the floor by legs 17 and 18, the latter being spaced by the rods 19. Mounted on top of the bars 15 and 16 are aligned bearings 21 and 22.

The fruit brushing unit 12 includes a pair of spaced heads 27 and 28, as seen in Fig. 5. Fixed to the heads 27 and 28 are brushes 29 forming a continuous brushing surface 30 as seen in Fig.

6. Rotatably mounted on the shaft 25 adjacent the heads 27 and 28 of the cylinder 26, are similar discs 33 and 34 formed to provide gear teeth 35 on the peripheries thereof. Rotatably mounted between the discs 33 and 34 is a plurality of rotary brushes 37 having suitable trunnions 38 and 39 on opposite ends thereof, the latter being journalled in the discs 33 and 34 respectively. The brushes 37 are equally spaced to provide fruit receiving channels 40 therebetween. Fixed on the trunnions 39 of the brushes 37 are sprockets 42 as shown in Figs. 2 and 5.

Rotatably mounted in suitable apertures in the discs 33 and 34 are rods 44 to which brushes 45 are secured, the latter being normally positioned to close the fruit receiving channels 40 as shown in Fig. 6. Fixed on one end of each of the rods 44, adjacent the outside face of the disc 33, is a lever 46, as shown in Fig. 5. Rotatably mounted on one end of each of the levers 46 is a roller 47. Connected at their ends to the levers 46 and suitable pins provided in the disc 33 are extension springs 48 which tend to urge the levers 46 into contact with stop pins 49 on the disc 33. Hung from the bar 15 of the frame 11 on vertical bars 50 and 51 is a cam 52 positioned to engage the rollers 47 of the levers 46 as shown in Figs. 4 and 5.

The brushing unit drive mechanism 13 includes a stud 55 mounted on the disc 34 as shown in Fig. 5. Rotatable on the stud 55 is a combined sprocket 56 and pinion 57, the sprocket 56 being aligned radially with the sprockets 42 of the brushes 37. Fixed on the shaft 25 so as to mesh with the pinion 57 is a gear 58 shown in Fig. 5. Trained about the sprocket 56 and engaging each of the sprockets 42 is an endless chain 60.

Mounted on the bar 16 of the frame 11 is a gear box 62 in which shafts 63 and 64 are mounted as shown in Fig. 3. Fixed on the shaft 63 is a gear 65 meshing with gear 58 of the shaft 25. The shaft 64 is driven by shaft 63 by means of gears 66 and 67 within the gear box 62. Fixed on the ends of the shafts 63 and 64 are sprockets 68 and 69, the purpose of which will be described hereinafter.

Journalled in suitable bearings provided on the bars 15 and 16 of the frame 11 is a shaft 70 having a pair of gears 71 keyed thereto, the latter meshing with the teeth 35 of the discs 33 and 34. Fixed on an end of the shaft 70, as shown in Fig. 1, is a sprocket 73 positioned in alignment with the sprocket 69, the shaft 70 being driven by a chain 74 trained about the sprockets 69 and 73.

The fruit feeding mechanism 14 includes a delivery conveyor 80, and a feeder 82, the conveyor 80 including a shaft 85 journalled in suitable bearings 86 provided on the legs 17 of the frame 11. Fixed on the shaft 85 are sprockets 87 about which chains 88 are trained, the latter carrying rollers 89.

Fixed on opposite ends of the conveyor shaft 85 are sprockets 90 and 91 as shown in Fig. 1, the sprocket 91 being positioned to drive a chain 92 which is trained about the sprocket 68 of the gear box 62. The shaft 85 is driven by any suitable power means connected to the sprocket 90.

The feeder 82 includes a shaft 91 journalled in brackets 92, the latter being fixed to the bars 15 and 16 of the frame 11. Fixed on the shaft 91 (as shown in Fig. 6) is an arcuate hopper 94 which is formed to provide upstanding end walls 96 and a downwardly disposed apron 97. The feeder 82 is operated by a shaft 98 journalled in a bearing 99 on the bar 15 as shown in Fig. 1. Fixed on opposite ends of the shaft 98 is a crank disc 100 and a pinion 101, the latter meshing with the gear teeth 35 of the disc 33. Provided on one end of the feeder shaft 91, as shown in Fig. 4, is a lever 103 which is operatively connected to the crank disc 100 by a connecting rod 104. Interposed between the conveyor 80 and the feeder 82 is an inclined drop board 106 supported by the bars 15 and 16 of the frame. Suitably mounted below the feeder 82 in concentric relation with the center of the washing unit 12 is a guard pan 107.

Operation of the brusher 10

When the conveyor 80 is set in motion to deliver fruit F to the brusher 10, the chain 92 extending from the sprocket 91 of shaft 85 causes the shaft 63 of the gear box 62 to rotate. Rotation of the shaft 63 is transmitted to the shaft 70 through the medium of the gears 66 and 67, sprockets 69 and 73, and chain 74. The discs 33 and 34 are driven at equal speeds by the gears 71 on shaft 70 in the direction indicated by the arrow $a$ appearing in Figs. 2 and 6. The power mechanism for transmitting power from the conveyor 80 to the discs 33 and 34 is designed so as to cause these discs to rotate at a relatively slow speed (approximately 8 R. P. M. in actual practice).

The delivery conveyor 80 moves at a predetermined speed in relation to the discs 33 and 34 so that each time the conveyor 80 delivers a row of fruit to the feeder 82, the discs 33 and 34 move a distance equal to the center to center distance between any adjacent two of the brushes 37.

Rotation of the shaft 63 is transmitted to the shaft 25 by the gears 65 and 58 shown in Fig. 3, causing the cylinder 26 to rotate in the direction indicated by the arrow $b$ of Fig. 6. The gear 58 drives the gear 57 and sprocket 56 shown in Figs. 2 and 5, causing the brushes 37 to be rotated by the chain 60. The speed of rotation of the brushes 37 in relation to the speed of the cylinder 26 is such that the peripheral speed of the brushes 37 is substantially equal to the speed of the brushing surface 30 of the cylinder 26, it being noted that the brushes 37 and cylinder 26 rotate in opposite directions.

As the discs 33 and 34 rotate, the brushes 45 serve to close the channels 40 until the latter are disposed on the under side of the machine 10, at this time the levers 46 are swung by the cam 52 causing the brushes 45 to be swung outward as shown in Fig. 6.

As the brushing unit 12 is actuated in the aforedescribed manner, the fruit feeding mechanism 14 operates to control the delivery of fruit from the conveyor 80 to the brushing unit 12 as follows: The shaft 98 is rotated by engagement of the gear 101 thereon with the teeth 35 of the disc 33. The connecting rod 104 extending from the crank disc 100 to the lever 103 causes the hopper 94 to move from the solid line position in which it is shown in Fig. 6 to the dotted line position shown therein. The hopper 94 makes one complete oscillation each time a row of fruit is dropped onto the drop board 106. The apron 97 of the hopper 94 retains a row of fruit on the drop board 106, as shown in Fig. 6, and when the hopper 94 is lowered to the dotted line position, the fruit so retained is allowed to roll onto one of the brushes 45 and is carried into the channel 40 when the brush 45 swings into closing position. After being closed in the channels 40, the fruit is carried around the brushing unit 12 and subjected to the scrubbing action of the brushing surface 30, the rotary brushes 37 and the brushes 45. When the brushes 45 arrive at the bottom of the unit 12, they are swung to open position as aforedescribed allowing the brushed fruit to fall onto a suitable discharge conveyor 110.

It is desired to point out that the brusher 10 may be used for any one of a number of different purposes in the treating of fresh whole fruit or other rollable objects. For instance, it may be used as a dry brusher to clean the fruit, or as a wet washer for washing the fruit, the machine in the latter case being preferably operated while drenched with water played continually thereon in streams by an overhead piping system. The machine 10 might also be used for drying fruit in which case it is preferably placed in a housing in which the air is rapidly circulated by a fan or other suitable mechanism. Where the latter use is made of the brusher 10, the housing would preferably cover the periphery of the brushing unit 12 and permit air to be directed against the brushes 29, 37 and 45 while the unit is in operation. It is also contemplated that where the brusher 10 is to be used as a dryer, air for use in the drying function might be introduced into the interior of the cylinder 26 by using a hollow shaft of relatively large diameter in place of the shaft 25, this hollow shaft having ports inside the cylinder 26, and the cylinder 26 having radial apertures in the brush backs thereof for permitting the air discharged into the interior of the cylinder to pass outwardly around the fruit being handled by the brusher.

Referring now to Figs. 7 to 12 inclusive, I have shown therein a washer 120, comprising a modified form of my invention, this washer including a soaking tank 121, a brushing unit 122, a clean out mechanism 123, and a driving mechanism 124 for the brushing unit 122. Certain parts of the brushing unit 122 are similar to corresponding parts of the aforedescribed unit 12, and these are designated by similar reference characters with a prime added thereto.

The tank 121 includes identical side walls 125 (only one of which is shown), end walls 126 and 127, and a bottom 128. Extending over the end wall 126 is an inlet drop board 130, and positioned above the tank 121 and extending transversely thereof is an inclined fruit discharge chute 131. Fixed to the side walls 125 are identical upstanding plates 133 (only one of which is shown), these having horizontal slots 135 therein as shown in Fig. 7. Supported between the plates 133 is an inclined drop board 137 for carrying fruit from the brushing unit 122 to the chute 131 in a manner to be described hereinafter.

Extending transversely of the tank 121 between the side walls 125 is a semi-circular member 140 having a plurality of openings 141 provided at one side thereof. The entire inner face of the member 140 is provided with closely spaced, yieldable fingers 142 of rubber or the like. Supported at its ends by the side walls 125 is a horizontal plate 143 spaced from the bottom 128 of the tank 121 to provide a horizontal passage 144. Extending upward from the plate 143 is a plate 145, this being spaced from the end wall 126 of the tank 121 to provide a vertical passage 146, and extending from the plate 145 to the member 140 is a horizontal member 147. Journalled at its ends in suitable bearings provided on the side walls 125 is a shaft 35', of a power driven paddle wheel 150 for feeding fruit from the tank 121 to the brushing unit 122 in a manner to be described hereinafter.

The brushing unit 122 is similar in construction to the aforedescribed brushing unit 12 of the unit 10 excepting that the brushes 45 of the brusher 12 are not used in the brusher 122 of the machine 120. As seen in Fig. 7, the brushing unit 122 is mounted between the side plates 125 of the tank 121 in concentric relation with the semi-circular member 140.

The clean out mechanism 123 includes a crank shaft 152 having a crank 153 at each end thereof. The shaft 152 is journalled in the plates 133 and driven in timely relation with the unit 122 by suitable gears 154 and 155. Supported at its ends within the slots 135 of plates 133 is a bar 157 having yieldable fingers 158 extending therefrom. Rigidly connected to the bar 157 is a pair of arms 159 connected to the cranks 153 of the shaft 152.

Figure 12:
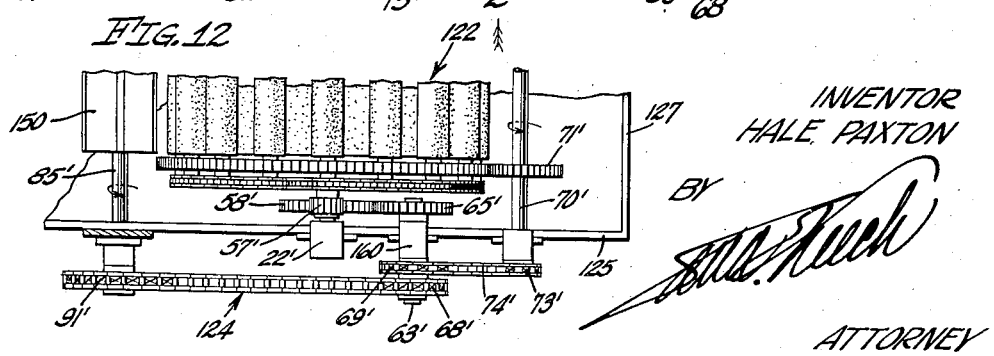
Fig. 12 is a fragmentary plan view of a portion of the machine shown in Fig. 7.

The driving mechanism 124 of the machine 120 is similar to the mechanism 13 of the machine 10 excepting that a bearing 160 is substituted for the gear box 62 as seen by comparing Figs. 1 and 12.

*Operation of the washer 120*

The tank 121 is filled with suitable cleaning solution S to the approximate level shown in Fig. 7. Fruit to be washed is delivered to the drop board 130 and allowed to fall into the solution S. The brushing unit 122 is rotated continuously and the paddle wheel 150 is driven in the direction indicated by the arrow in timely relation with the brushing unit 122. The wheel 150 engages the fruit floating in the solution S and discharges the fruit into the channels 40' of the brusher 122. The fruit is carried around by the brusher 122 and thoroughly brushed by the brushing surface 30' and cylindrical brushes 37'. The yieldable fingers 142 of the member 140 serve to retain fruit in channels 40' when the latter are disposed on the under side of the brusher 122. Rotation of the brushing unit 122 causes the solution S to circulate around the under side of the unit 122 and pass through the openings 141 of the member 140. The solution constantly passes in the directions indicated by the arrows in Fig. 7 and tends to carry the soaking fruit to the paddle wheel 150.

After being carried around by the brushing unit 122, the fruit is cleaned out of the channels 40' by the clean out mechanism 123, the fingers 158 thereof extending into and out of the channels 40' as shown in Figs. 9, 10 and 11. After being removed from the channels 40', the fruit rolls down the drop board 137 and is discharged from the machine 120 by the chute 131.

It is thus seen that the machine 120 provides a simple and compact unit for soaking, submerging and brushing fruit.

Although I have shown and described but one preferred and one modified form of my invention, it is to be understood that many modifications and changes might be made therein without departing from the spirit of the invention or the scope of the appended claims.

I claim as my invention:

1. In a fruit treating machine, the combination of: a frame; a relatively large cylinder rotatably mounted on said frame; means on the outside of said cylinder providing a fruit treating surface; a plurality of relatively small, rotatable fruit treating elements adjacent the fruit treating surface of said cylinder, the axes of said treating elements extending in parallel relation with the axis of said cylinder, said fruit treating elements being spaced from each other to provide fruit receiving channels therebetween; means for retaining said fruit in said channels; means for rotating said fruit treating elements in a common direction of rotation; and means for revolving all of said fruit treating elements as a unit about the axis of said large cylinder in a direction opposite to the direction of travel of said cylinder.

2. In a fruit treating machine, the combination of: a frame; a power driven shaft on said frame; a pair of spaced, circular plates rotatable on said shaft; a cylinder fixed on said shaft between said plates; means on the outside of said cylinder providing a fruit treating surface; a plurality of relatively small, cylindrical fruit treating elements adjacent the fruit treating surface of said cylinder, said elements being journalled in said plates and spaced to provide fruit receiving channels therebetween; movable closure means extending between said plates over said channels to retain fruit therein; means for rotating each of said cylindrical fruit treating elements about their respective axes; means for rotating said plates at uniform speed in a direction of rotation opposite to that of said cylinder; control means for opening said closure means to permit removal of fruit contained in said channels, said closure means being retained in open position after removal of treated fruit to permit recharging said channels with fruit to be treated.

3. A combination as in claim 2 having means for automatically opening each of said closure means when said channels are disposed on the under side of said cylinder to permit said treated fruit to gravitate from said channels.

4. In a fruit treating machine, the combination of: a relatively large, rotatable cylinder having a fruit treating surface on the outside thereof; a plurality of relatively small, rotatable fruit treating elements adjacent the outside of said cylinder, the axes of said elements being parallel with the axis of said cylinder, said treating elements being spaced from each other to provide fruit receiving channels therebetween; means for rotating each of said elements; means for moving all of said elements as a unit about said cylinder; stationary means on the under side of said cylinder to retain fruit in said channels; means for feeding fruit to be treated to said channels; and means to remove treated fruit from said channels.

5. In a fruit washing machine, the combination of: a tank containing cleaning solution; means on said tank providing an endless brushing surface, said surface being partially submerged in said solution and movable in a given direction; a plurality of rotatable brushes adjacent said endless brushing surface, said rotatable brushes extending transversely of the direction of travel of said brushing surface and being spaced to provide fruit receiving channels therebetween, said rotatable brushes being movable as a unit relative to said endless brushing means; means for feeding fruit from said solution to said channels; and means for removing said fruit from said channels after the latter has been submerged in said solution and brushed by said brushing surface and said rotatable brushes.

6. In a fruit washing machine, the combination of: a tank containing cleaning solution; a cylinder rotatably mounted in said tank about a horizontal axis, the lower portion of said cylinder being submerged in said solution; means on the outside of said cylinder providing a brushing surface; a plurality of relatively small cylindrical brushes adjacent said brushing surface, said brushes being spaced to provide fruit receiving channels therebetween, each of said brushes being rotatable about an axis parallel with the axis of said cylinder; means for rotating all of said cylindrical brushes as a unit about the axis of said cylinder in the same direction as that of said cylinder; means for feeding fruit from said solution to said fruit receiving channels, said fruit being submerged in said solution and brushed while remaining in said channels; and means for removing said fruit from said channels after said fruit has been brushed.

7. In a machine for treating rollable objects, the combination of: a drum rotatably mounted on a horizontal axis; means for rotating said drum; a series of object spacing rotary brushes disposed parallel with said drum in spaced relation with each other and the exterior surface of said drum; means for causing said brushes to progress over said surface while maintaining said spaced relations; means for rotating said brushes; means for feeding rollable objects to the spaces between adjacent brushes; and means for receiving objects from said spaces.

8. A combination as in claim 7 in which means is provided for covering the spaces between adjacent brushes from the outside between the times objects are received in and discharged from said spaces, said space closing means, progressing with said elements and comprising individual covers for said spaces said covers being individually operable to uncover the respective spaces covered thereby.

9. In a machine for treating fresh whole fruit, the combination of: a drum having brush bristles on its exterior surface and rotatable on a horizontal axis; means for rotating said drum; a series of rotary brushes disposed in spaced relation with each other and with said bristle surface and parallel with said drum; means for rotating said brushes in the same direction; means for causing said brushes to progress over said bristle surface while maintaining said spaced relations; means for feeding fruit to the spaces between said brushes; and means for receiving fruit from said inter-brush spaces.

10. In a machine for treating fresh whole fruit, the combination of: a drum having brush bristles on its exterior surface and rotatable on a horizontal axis; means for rotating said drum; a series of rotary brushes disposed in spaced relation with each other and with said bristle surface; means for rotating said brushes in the same direction as said drum; means for causing said brushes to progress over said bristle surface while maintaining said spaced relations to give said brushes and said drum equal relative peripheral speeds at points of propinquity; means for feeding fruit to the spaces between said brushes; and means for receiving fruit from said inter-brush spaces.

11. In a machine for treating rollable objects, the combination of: a drum rotatably mounted on a horizontal axis; means forming a convex treating surface on the exterior of said drum; a series of object spacing and treating rolls disposed in spaced relation about said treating surface to receive objects to be treated on the drum treating surface; means for rotating said drum; means for causing said rolls to progress over said surface while maintaining said spaced relation; means for feeding rollable objects to and facilitating their discharge from the spaces between adjacent rolls; and means for rotating said rolls as they progress over said surface.

12. In a machine for treating rollable objects, the combination of: a drum rotatably mounted on a horizontal axis; means forming a convex treating surface on the exterior of said drum; a series of object spacing and treating elements disposed in spaced relation about said treating surface; means for rotating said drum; means for causing said elements to progress over said surface while maintaining said spaced relation; means for feeding rollable objects to and facilitating their discharge from the spaces between adjacent elements, said elements having substantially cylindrical treating faces; and means for rotating said elements as they progress over said surface.

13. In a machine for treating rollable objects, the combination of: a drum rotatably mounted on a horizontal axis; means for rotating said drum; a series of object spacing and treating rolls disposed in spaced relation with each other and the exterior surface of said drum to receive objects to be treated; means for causing said rolls to progress over said surface while maintaining said spaced relations; means for rotating said treating rolls as they are progressed over said surface; means for feeding rollable objects to the spaces between adjacent rolls; means for receiving objects from said spaces; and means for covering the spaces between adjacent rolls from the outside during the intervals between the receipt of objects in and the discharge of the latter from said spaces.

14. In a machine for treating rollable objects, the combination of: a drum rotatably mounted on a horizontal axis; means for rotating said drum; a series of object spacing elements disposed in spaced relation with each other and the exterior surface of said drum; means for causing said elements to progress over said surface while maintaining said spaced relations; means for feeding rollable objects to the spaces between adjacent elements; means for receiving objects from said spaces; means mounted to cover the spaces between adjacent elements from the outside during the intervals between the receipt of objects in and the discharge of the latter from said spaces, said space covering means progressing with said elements and comprising individual covers for said spaces; and means for individually operating said covers to uncover the respective spaces covered thereby to permit objects to be admitted to and discharged from said spaces.

HALE PAXTON.